United States Patent
Watanabe

(10) Patent No.: US 10,099,517 B2
(45) Date of Patent: Oct. 16, 2018

(54) SIDE-REINFORCED RUN-FLAT TIRE

(71) Applicant: BRIDGESTONE CORPORATION, Chuo-ku, Tokyo (JP)

(72) Inventor: Toshiyuki Watanabe, Higashiyamato (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 31 days.

(21) Appl. No.: 15/038,794

(22) PCT Filed: Jul. 2, 2014

(86) PCT No.: PCT/JP2014/003537
§ 371 (c)(1),
(2) Date: May 24, 2016

(87) PCT Pub. No.: WO2015/097929
PCT Pub. Date: Jul. 2, 2015

(65) Prior Publication Data
US 2017/0036492 A1   Feb. 9, 2017

(30) Foreign Application Priority Data
Dec. 25, 2013 (JP) ............................. 2013-266838

(51) Int. Cl.
*B60C 17/00* (2006.01)
*B60C 19/00* (2006.01)

(52) U.S. Cl.
CPC ........ *B60C 17/0009* (2013.01); *B60C 19/002* (2013.01); *B60C 2017/0054* (2013.01)

(58) Field of Classification Search
CPC .. B60C 19/002; B60C 17/08; B29D 2030/201
USPC ............................................................. 152/458
See application file for complete search history.

(56) References Cited

U.S. PATENT DOCUMENTS

| | | | |
|---|---|---|---|
| 6,715,842 B1* | 4/2004 | Bopp | B60C 19/002 152/153 |
| 2011/0275767 A1* | 11/2011 | Yamakoshi | C08G 18/12 525/457 |

FOREIGN PATENT DOCUMENTS

| | | |
|---|---|---|
| CN | 1774349 A | 5/2006 |
| CN | 1882444 A | 12/2006 |
| EP | 2749433 A1 | 7/2014 |
| JP | 2006-192927 A | 7/2006 |
| JP | 2010-132168 A | 6/2010 |
| JP | 2012-007074 A | 1/2012 |
| JP | 2012250635 A | 12/2012 |
| JP | 2012254655 A | 12/2012 |
| JP | 2013-184637 A | 9/2013 |
| WO | 2012164960 A1 | 12/2012 |
| WO | 2013031165 A1 | 3/2013 |

* cited by examiner

*Primary Examiner* — Robert C Dye
*Assistant Examiner* — Sedef E Paquette
(74) *Attorney, Agent, or Firm* — Kenja IP Law PC

(57) ABSTRACT

Provided is a side-reinforced run-flat tire including a tread portion, a pair of sidewall portions extending on both sides of the tread portion, and reinforcing rubber provided in the sidewall portions, the side-reinforced run-flat tire further including: short fibers bonded, via an adhesive layer, to at least a portion of a region of a tire inner surface that is located in each of side portions, wherein the adhesive layer has a heatproof temperature of from 50 to 100° C.

11 Claims, 3 Drawing Sheets

SIDE-REINFORCED RUN-FLAT TIRE

TECHNICAL FIELD

The present disclosure relates to a side-reinforced run-flat tire.

BACKGROUND

As a kind of run-flat tire that allows a tire to run a predetermined distance without losing the load support function even when the inner pressure of the tire decreases due to puncture or the like, a side-reinforced run-flat tire, whose sidewall portions have improved rigidity, has been proposed (refer to Patent Literature 1, for example). A side-reinforced run-flat tire includes, in the sidewall portions, reinforcing rubber having a relatively high modulus of elasticity and a crescent sectional shape. The reinforcing rubber plays the role of supporting the load of the vehicle during running (run-flat running) where the inner pressure equals atmospheric pressure due to puncture.

CITATION LIST

Patent Literature

PL1: JP 2013184637A

SUMMARY

Technical Problem

However, the conventional side-reinforced run-flat tire is problematic in that the effect of reducing cavity resonance sound (hereinafter, may be called the "sound absorption effect") is not sufficiently obtained.

To reduce cavity resonance sound of a run-flat tire, the present inventors have arrived at the idea of bonding numerous short fibers to a tire inner surface and conducted earnest studies on the run-flat tire in which short fibers are bonded to the tire inner surface via an adhesive layer, and thus, achieved the following findings.

It is necessary to confirm the history of run-flat running of the side-reinforced run-flat tire at the time of, for example, replacement. The history of run-flat running may be confirmed by visually observing the presence and degree of strain, wrinkles, and the like generated in an inner liner constituting the tire inner surface, and the confirmation requires long-time practice and experience. Especially in cases of the side-reinforced run-flat tire in which numerous short fibers are bonded to the tire inner surface, the short fibers interrupt visibility from a tire inner cavity to the inner liner, and this makes it difficult to confirm the aforementioned history.

Furthermore, during run-flat running of the side-reinforced run-flat tire, the reinforcing rubber is under the load, and the temperature of the reinforcing rubber increases (to approximately 200° C.). Especially in cases of the side-reinforced run-flat tire in which numerous short fibers are bonded to the tire inner surface, heat tends to build up around the numerous short fibers. This may lead to a remarkable increase in the temperature of the reinforcing rubber, and the heat in the reinforcing rubber tends to accelerate deterioration.

In view of the above, the present disclosure is to make it easy to confirm the history of run-flat running of the side-reinforced run-flat tire in which numerous short fibers are bonded to the tire inner surface, and the present disclosure is also to prevent deterioration caused by heat in the reinforcing rubber provided in the sidewall portions.

Solution to Problem

The present inventors have arrived at the idea of making it easy to confirm the history of run-flat running and of preventing deterioration caused by the heat in the reinforcing rubber and reducing cavity resonance sound, by adjusting the heatproof temperature of the adhesive layer, which is used to bond the short fibers to the tire inner surface, to an appropriate range.

The gist of the present disclosure is as follows.

One of aspects of the present disclosure resides in a side-reinforced run-flat tire including a tread portion, a pair of sidewall portions extending on both sides of the tread portion, and reinforcing rubber provided in the sidewall portions, the side-reinforced run-flat tire further including: short fibers bonded, via an adhesive layer, to at least a portion of a region of a tire inner surface that is located in each of side portions, wherein the adhesive layer has a heatproof temperature of from 50 to 100° C. The side-reinforced run-flat tire according to the present disclosure makes it easy to confirm the history of run-flat running and also provides the effects of preventing, during run-flat running, deterioration in the reinforcing rubber caused by heat and reducing, during normal running, cavity resonance sound by the short fibers.

In a preferred embodiment, the side-reinforced run-flat tire according to the present disclosure, further includes: short fibers bonded to at least a portion of a region of the tire inner surface that corresponds to the tread portion. The above structure further enhances the effect of reducing cavity resonance sound by the short fibers 10.

In another preferred embodiment, the side-reinforced run-flat tire according to the present disclosure satisfies the relation $0.02 \leq A \times N \leq 0.06$, when an average sectional area of a section of each of the short fibers that is not in contact with the tire inner surface is defined as A ($mm^2$/each fiber), and the number of the short fibers bonded per 1 $mm^2$ area in the region of the tire inner surface where the short fibers are bonded is defined as N (fibers/$mm^2$). The above structure further enhances the sound absorption effect by the short fibers effectively while preventing an increase in the weight of the tire.

Advantageous Effects

According to the side-reinforced run-flat tire of the present disclosure, the short fibers bonded, via the adhesive layer, to the tire inner surface regions corresponding to the reinforcing rubber are detached during run-flat running, thereby making it easy to confirm the history of run-flat running.

Furthermore, the side-reinforced run-flat tire according to the present disclosure provides the effects of preventing, during run-flat running, deterioration in the reinforcing rubber caused by heat and reducing, during normal running, cavity resonance sound by the short fibers.

DETAILED DESCRIPTION

Embodiments of a side-reinforced run-flat tire according to the present disclosure will be described in detail below for illustration with reference to the drawings.

Figure 1:
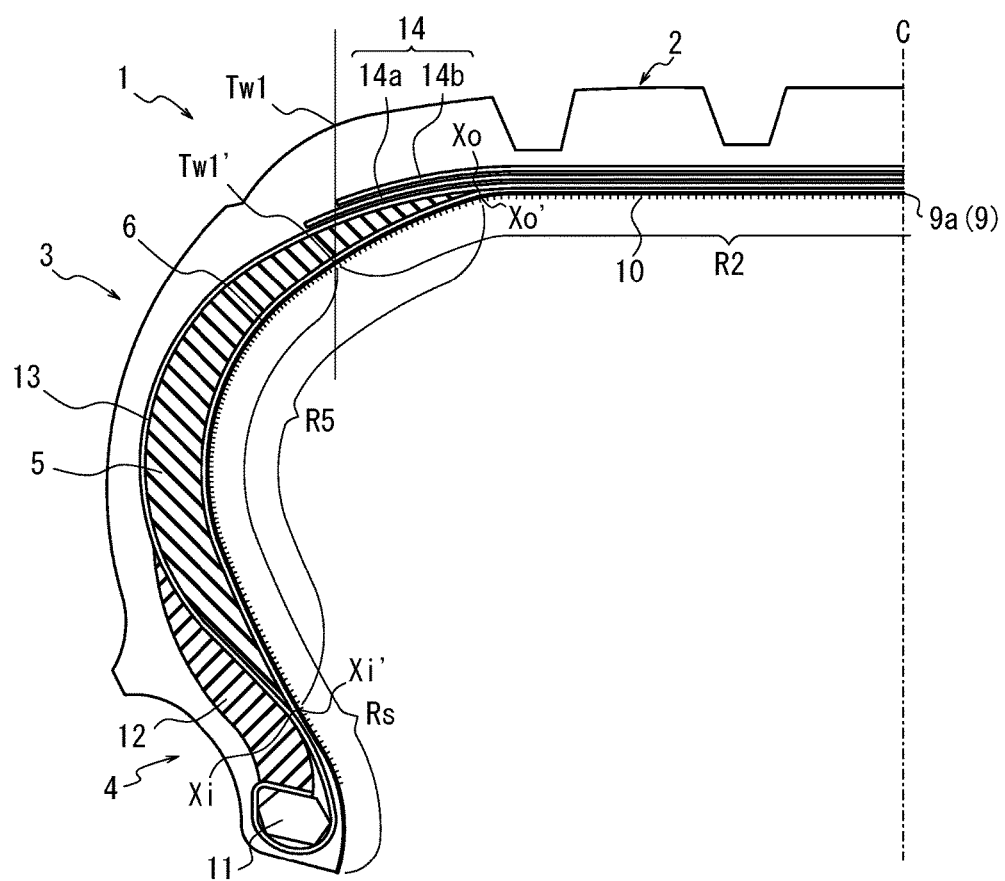
FIG. 1 is a sectional view taken along the tire width direction of a half of a side-reinforced run-flat tire prior to puncture according to an example of the present disclosure.
Figure 2:
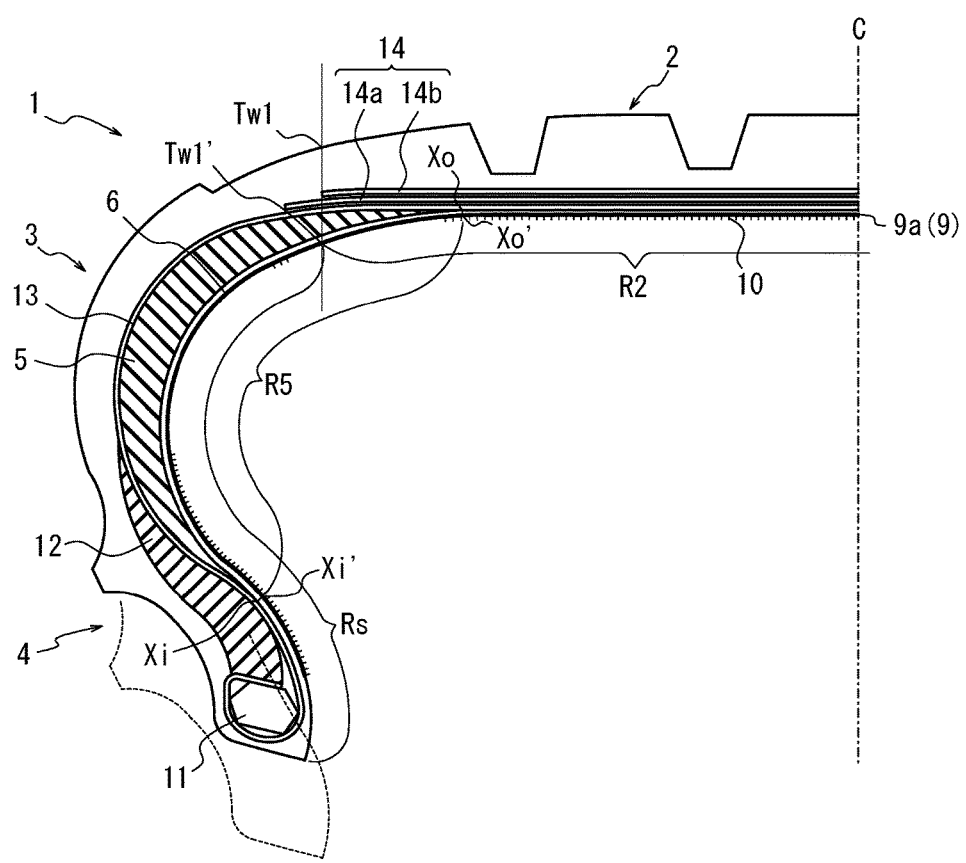
FIG. 2 is a sectional view taken along the tire width direction of a half of a side-reinforced run-flat tire after puncture followed by run-flat running according to an example of the present disclosure.

FIG. 1 illustrates a half of a side-reinforced run-flat tire prior to puncture according to an example of the present disclosure, and FIG. 2 illustrates a half of a side-reinforced run-flat tire after puncture followed by run-flat running according to an example of the present disclosure (where an outer profile of a bead portion prior to puncture in FIG. 1 is indicated by a dotted line).

The side-reinforced run-flat tire (hereinafter, may be called the "tire 1") according to an example of the present disclosure includes a tread portion 2, a pair of sidewall portions 3 extending on both sides of the tread portion 2, and bead portions 4 each extending contiguously with a corresponding one of the sidewall portions 3. The tire 1 also includes reinforcing rubber 5 provided in each sidewall portion 3 and having a crescent sectional shape.

The tire 1 needs to include short fibers 10 bonded, via an adhesive layer 9, to at least portions of tire inner surface regions Rs located in side portions (in FIGS. 1 and 2, the short fibers 10 are bonded, via an adhesive agent 9a, to the entire tire inner surface regions Rs located in the side portions).

The "tire inner surface 6" refers to a tire surface that is exposed to a tire inner cavity.

Unless otherwise defined, various dimensions of the side-reinforced run-flat tire according to the present disclosure refer to those measured when the tire is mounted to an applicable rim, inflated with a specified internal pressure, and applied with no load. Herein, an "application rim" represents a standard rim (which is also called an "approved rim" or a "recommended rim") in an applicable size prescribed by an industrial standard which is valid in an area where the tire is manufactured or used. Examples of the industrial standard include: "YEAR BOOK" by the Tire and Rim Association Inc. in the United States; "STANDARDS MANUAL" by the European Tyre and Rim Technical Organization in Europe; and "JATMA YEAR BOOK" by the Japan Automobile Tire Manufacturers Association Inc. in Japan. A "specified internal pressure" represents an air pressure specified by the above standard in correspondence with the maximum load capacity, and the "maximum load capacity" represents the maximum mass that may be applied to the tire according to the above standard.

Each of the "tire inner surface regions Rs located in the side portions" refers to a region of the tire inner surface that, in the section of the tire taken along the tire width direction, extends from an intersection Tw1' (Tw2') between a straight line passing a tread ground-contact end Tw1 (Tw2) (note that only Tw1 is illustrated in FIG. 1) and extending in parallel with the tire radial direction and the tire inner surface, to the corresponding bead toe. Herein, the "tread ground-contact ends Tw1 and Tw2" refer to both ends of the tire in the tire width direction that contact a flat plate when the pneumatic tire is mounted to an applicable rim, inflated with a specified internal pressure, and then placed upright on the flat plate at a standstill with a predetermined load exerted thereon.

In the tire 1 herein, the heatproof temperature of the adhesive layer 9 with which the short fibers 10 are bonded must be from 50 to 100° C.

The "heatproof temperature" of the adhesive layer 9 refers to the temperature of the adhesive agent 9a measured by the thermal stability test method (open method). In detail, the "heat proof temperature" refers to a temperature that satisfies (1) an appearance test (to determine the condition of the appearance of a cured product that has been left at the temperature for 100 hours by visually observing whether local powdering, fracture, cracking, deformation, or the like has not occurred in the sample piece) and (2) an adhesion test (to determine whether an adhesive agent is not detached after being applied to a metal piece and left at the temperature for 100 hours).

As described earlier, in cases of the side-reinforced run-flat tire in which numerous short fibers 10 are bonded to the tire inner surface 6, the short fibers 10 interrupt visibility from the tire inner cavity to the tire inner surface 6, and this makes it difficult to confirm the aforementioned history. In this regard, since, in the side-reinforced run-flat tire according to the present disclosure, the heatproof temperature of the adhesive layer 9 is 100° C. or less, during run-flat running (refer to FIG. 2) where the reinforcing rubber 5 provided in the sidewall portion is under the load and where the temperature of the reinforcing rubber 5 increases (to, for example, approximately 200° C.), the adhesive layer 9 is softened to lose the adhesive properties. Accordingly, during run-flat running, the short fibers 10 bonded, via the adhesive layer 9, to the tire inner surface regions Rs located in the side portions are detached (note that FIG. 2 illustrates the state where the short fibers 10 are detached in a portion of the tire inner surface region Rs located in the corresponding side portion). This makes it easy to visually confirm the history of run-flat running.

Furthermore, as described earlier, in cases of the side-reinforced run-flat tire in which numerous short fibers 10 are bonded to the tire inner surface 6, the short fibers 10 has heat storage properties. This may lead to a remarkable increase in the temperature of the reinforcing rubber 5, and the heat in the reinforcing rubber 5 tends to accelerate deterioration.

In this regard, since, in the side-reinforced run-flat tire according to the present disclosure, the heatproof temperature of the adhesive layer 9 is 100° C. or less, during run-flat running (refer to FIG. 2), the short fibers 10 bonded, via the adhesive layer 9, to the tire inner surface regions Rs located in the side portions are detached. Consequently, an increase in the temperature of the reinforcing rubber 5 is prevented, and deterioration in the reinforcing rubber 5 caused by the heat is prevented.

Moreover, since the heatproof temperature of the adhesive layer 9 is 50° C. or more, during normal running where the reinforcing rubber 5 is not under great load, the adhesive layer 9 is prevented from softening, and the effect of reducing cavity resonance sound by the bonded short fibers 10 is obtained.

Additionally, in the side-reinforced run-flat tire according to the present disclosure, the short fibers 10 only need to be bonded to at least a portion of the tire inner surface region Rs located in each side portion.

Herein, the heatproof temperature of the adhesive layer 9 is preferably from 60 to 70° C.

With the heatproof temperature in the above range, the short fibers 10 in the portions of the reinforcing rubber 5 are detached even by run-flat running for a short period of time, thereby making it easy to confirm the history of run-flat running.

The adhesive layer 9, which has adhesive properties, is not particularly limited to any material and may be an adhesive agent, a double-sided adhesive tape, a gluing agent, or the like. In the side-reinforced run-flat tire 1 according to an example of the present disclosure illustrated in FIGS. 1 and 2, the adhesive layer 9 includes an adhesive agent 9a.

Examples of the adhesive agent 9a may include, but are not particularly limited to, a urethane resin-based adhesive agent, an acrylic resin-based adhesive agent, an epoxy resin-based adhesive agent, a chloroprene rubber-based adhesive agent.

The adhesive layer 9 is required to have relatively high fracture strength that is sufficient to prevent the adhesive layer 9 from being detached upon repeated deformation of the tread portion 2 and the sidewall portions 3. It is also required that the high fracture strength be maintained at a normal temperature condition during use of the tire, namely, at a temperature of from −30 to 80° C. Furthermore, the adhesive layer 9 is required to have properties that allow formation of the adhesive layer 9 while the thickness is maintained uniform. As an adhesive agent having these properties, for example, a mixture of polyol containing two or more hydroxyl groups (OH groups) in the molecule and isocyanate containing an isocyanate group (an NCO group), at a weight ratio of polyol to isocyanate of from 2.5 to 3.5, is preferred.

The "heatproof temperature" of the adhesive agent 9a refers to a "softening temperature" measured in accordance with JIS K6833.

To ensure reduction of cavity resonance sound in the tire 1, the percentage of an area of the tire inner surface region (hereinafter, may be called the "short fiber-bonded region") to which the short fibers 10 are bonded, in a surface area of the tire inner surface 6, is preferably 25% or more.

In the short fiber-bonded region, the number of the short fibers 10 per unit area is preferably 100 fibers/cm$^2$ and is more preferably 1000 fibers/cm$^2$ to sufficiently obtain the effect of reducing cavity resonance sound. Furthermore, the number of the short fibers 10 per unit area is preferably 50000 fibers/cm$^2$ or less and is more preferably 10000 fibers/cm$^2$ or less because otherwise too many fibers will decrease the effect of reducing cavity resonance sound.

The average length L of the short fibers 10 is preferably 0.5 mm or more and is more preferably 2 mm or more to sufficiently obtain the effect of reducing cavity resonance sound. The length L is also preferably 10 mm or less and is more preferably 8 mm or less to prevent the short fibers 10 from being tangled into a lump and to sufficiently obtain the effect of reducing cavity resonance sound. The "length" of the short fibers 10 does not include portions of the short fibers 10 that are contained in the adhesive layer 9 and refers to the length of portions of the short fibers 10 that are exposed to the tire inner cavity.

The average diameter D of the short fibers 10 is preferably 1 μm or more and is more preferably 20 μm or more to prevent difficulty in preparing the short fibers 10 due to a decrease in productivity of the short fibers 10 caused when fibers easily snap during a manufacturing process of the short fibers 10. The diameter D is also preferably 500 μm or less and is more preferably 200 μm or less to prevent a decrease in fuel efficiency of a vehicle to which the tire is mounted because otherwise the bonding short fibers 10 will increase the weight of the tire significantly and increase the rolling resistance of the tire.

The ratio L/D of the average length L of the short fibers 10 to the average diameter D of the short fibers 10 is preferably 5 or more and is more preferably 10 or more to obtain the effect of reducing cavity resonance sound sufficiently. The ratio L/D is also preferably 2000 or less and is more preferably 1000 or less to prevent the short fibers 10 from being tangled into a lump and becoming an obstruction to obtaining the sufficient effect of reducing cavity resonance sound.

As materials of the short fibers 10, organic synthetic fibers, inorganic fibers, recycled fibers and natural fibers may be considered. Herein, examples of organic synthetic fibers may include polyolefin such as polyethylene, polypropylene, and polybutene, aliphatic polyamide such as nylon, aromatic polyamide, polyester such as polyethylene terephthalate, polyethylene naphthalate, polyethylene succinate, and polymethyl methacrylate, syndiotactic 1,2-polybutadiene, an acrylonitrile-butadiene-styrene copolymer, polystyrene, and fibers composed of a copolymer of these. Examples of inorganic fibers may include carbon fibers and glass fibers. Examples of recycled fibers may include rayon and cupro. Examples of natural fibers may include cotton, silk, and wool.

As illustrated in FIGS. 1 and 2, the tire 1 further includes the short fibers 10 bonded, via the adhesive agent 9a, to at least a portion of a tire inner surface region R2 corresponding to the tread portion (in FIGS. 1 and 2, the short fibers 10 are bonded, via the adhesive agent 9a, to the entire tire inner surface region R2 corresponding to the tread portion). The "tire inner surface region R2 corresponding to the tread portion" refers to a region of the tire inner surface that, in the section of the tire taken along the tire width direction, extends from an intersection Tw1' between a straight line passing one tread ground-contact end Tw1 and extending in parallel with the tire radial direction and the tire inner surface, to an intersection Tw2' (which is not illustrated) between a straight line passing the other tread ground-contact end Tw2 (which is not illustrated) and extending in parallel with the tire radial direction and the tire inner surface.

The above structure further enhances the effect of reducing cavity resonance sound by the short fibers 10.

In this regard, in the event of puncture, a typical tire (which is not a run-flat tire) is generally repaired by using a puncture repairing liquid. In a tire in which the short fibers 10 are bonded to the tire inner surface 6 to reduce cavity resonance sound of the tire, the short fibers 10 sometimes absorb the puncture repairing liquid and interfere with flow on the tire inner surface 6. Accordingly, in a typical tire in which the short fibers 10 are bonded, the tire inner surface region R2 corresponding to the tread portion is preferably provided with a region (hereinafter, may be called the "short fiber-non-bonded region") that extends continuously in the tire circumferential direction and that does not have the short fibers 10 bonded.

On the other hand, in the event of puncture, a run-flat tire is capable of running a predetermined distance without repair using the puncture repairing liquid. In a run-flat tire in which the short fibers 10 are bonded, the short fibers 10 may be bonded to the region R2 without the need for providing the short fiber-non-bonded region in the tire inner surface region R2 corresponding to the tread portion for the above reason. According to the above structure, compared with a typical tire in which the short fibers 10 are bonded to all the regions except for the short fiber-non-bonded region for facilitating puncture repair, the effect (sound absorption effect) of reducing cavity resonance sound by the short fibers 10 is enhanced.

Furthermore, as illustrated in FIGS. 1 and 2, the tire 1 includes the short fibers 10 bonded, via the adhesive agent 9a, to tire inner surface regions R5 corresponding to the reinforcing rubber. Each of the "tire inner surface regions R5 corresponding to the reinforcing rubber" refers to a region of the tire inner surface that, in the section of the tire taken along the tire width direction, extends from the foot Xi' of a perpendicular line drawn from the innermost end Xi of the corresponding reinforcing rubber 5 in the tire radial direction to the tire inner surface 6, to the foot Xo' of a perpendicular line drawn from the outermost end Xo of the reinforcing rubber 5 in the tire radial direction to the tire inner surface 6.

With this structure, the effects of the side-reinforced run-flat tire according to the present disclosure, that is to say, the effects of making it easy to confirm the history of run-flat running and of preventing deterioration caused by heat in the reinforcing rubber, are more likely to be obtained.

The tire 1 illustrated in FIGS. 1 and 2 further includes the short fibers 10 bonded, via the adhesive agent 9a, to the entire tire inner surface regions Rs located in the side portions and to the entire tire inner surface region R2 corresponding to the tread portion.

The above structure further enhances the effect of reducing cavity resonance sound by the short fibers 10.

Additionally, in the tire 1, the short fibers 10 are not bonded on the periphery of the bead portions to prevent the short fibers from being detached when the tire 1 is mounted to a rim.

Herein, when an average sectional area of the section of each short fiber that is not in contact with the tire inner surface 6 is defined as A (mm²/each fiber), and the number of the short fibers 10 bonded per 1 mm² area in the regions of the tire inner surface 6 where the short fibers 10 are bonded is defined as N (fibers/mm²). In the tire 1 herein, A and N preferably satisfy the relation $0.02 \leq A \times N \leq 0.06$.

Additionally, the values or the like of A and N are measured with respect to a tire mounted to an applicable rim, inflated with a specified internal pressure, and applied with no load.

Furthermore, the "sectional area of the section of each short fiber 10 that is not in contact with the tire inner surface" refers to the sectional area measured in the section orthogonal to the longitudinal direction of the short fiber 10 and also refers to the maximum sectional area when the sectional area of the section of the short fiber varies.

$A \times N$ defined above refers to the percentage of the sectional areas of the short fibers 10 per unit area of the short fiber-bonded regions. Herein, $A \times N$ is preferably 0.02 or more and is more preferably 0.03 or more to prevent a sharp decrease in the effect (sound absorption effect) of reducing cavity resonance sound of the tire. $A \times N$ is also preferably 0.06 or less and is more preferably 0.05 or less to prevent an adverse decrease in the sound absorption effect of the tire and an increase in rolling resistance due to an increase in the weight of the tire. By thus adjusting the value of $A \times N$ in the range from 0.02 to 0.06, an increase in the weight of the tire is prevented, and the sound absorption effect of the short fibers 10 is enhanced effectively.

The tire 1 further includes a bead core 11 and a bead filler 12 embedded in each of the bead portions 4, a carcass 13 extending toroidally across the bead cores 11, and a two-layered belt 14 (14a and 14b).

Although in the tire 1 the reinforcing rubber 5 is disposed on the inner side of the carcass 13 in the tire width direction, the side-reinforced run-flat tire according to the present disclosure is not limited to this structure, and the reinforcing rubber 5 may also be disposed on the outer side of the carcass 13 in the tire width direction.

The pneumatic tire according to the present disclosure may be manufactured by a method well-known to a person skilled in the art.

The short fibers 10 may be bonded to the tire inner surface 6 by various methods and may be preferably bonded to the tire inner surface 6 by electrostatic flocking processing. Electrostatic flocking processing is a technique where a voltage is applied to the short fibers 10 following electrode-position processing, the short fibers are anchored toward an object on which the adhesive layer 9 is formed in advance, and the short fibers 10 are implanted onto the object perpendicularly.

Accordingly, the short fibers 10 may be bonded uniformly even to the surface of an object with a complicated shape, and thus, the short fibers 10 may be bonded to the curved tire inner surface 6 easily.

EXAMPLES

The present disclosure is described in more detail below with reference to Examples, by which the present disclosure is not intended to be limited in any way.

Example 1

Approximately 100 g of nylon short fibers, each having a thickness of 20 denier ($\varphi$50 μm) and a length of 4.0 mm, were bonded to the inner surface of a run-flat tire (225/50R17) by way of electrostatic flocking processing with use of an adhesive agent (EU-4550 manufactured by ALPS Chemicals Mfg. Co., Ltd.) having a heatproof temperature of 70° C. (and containing a mixture of caster oil-modified polyol and an adhesive agent modified isocyanate at a compounding ratio [parts by weight] of 3:1). The short fibers were bonded to regions of approximately 80% of the tire inner surface, including the tire inner surface regions located in the side portions and the tire inner surface region corresponding to the tread portion.

The run-flat tire prepared as above was mounted to an application rim (6.5JJ-16) prescribed by JATMA standard.
(A1) Facilitation of Confirmation of History of Run-Flat Running The above run-flat tire mounted to the rim was driven on run-flat for 1 minute on a drum test machine under the conditions of an internal pressure of 0 kPa, a load of 4.4 kN, and a rate of 80 km/h. After the run-flat running, the run-flat tire was dismounted from the rim, and the history of run-flat running was confirmed visually. Likewise, the above run-flat tire was driven on run-flat for 10 minutes, and the history of run-flat running was confirmed in a similar manner. Furthermore, for comparison, the above run-flat tire was driven on non-run-flat for 10 minutes, and the history of run-flat running was confirmed.

Table 1 shows results of the assessment. Although the short fibers bonded to the tire inner surface regions corresponding to the reinforcing rubber were detached, the remaining short fibers bonded to the tire inner surface regions located in the side portions and to the tire inner surface region corresponding to the tread portion were remained undetached (refer to FIG. 2). By taking advantage of detachment of the short fibers near the reinforcing rubber, the history of run-flat running was confirmed.

(A2) Durability of Reinforcing Rubber

The above run-flat tire mounted to the rim was driven (run-flat running) for 1 minute on a drum test machine under the conditions of an internal pressure of 0 kPa, a load of 4.4 kN, and a rate of 80 km/h. After the run-flat running, the run-flat tire was dismounted from the rim, and the presence of strain and wrinkles in the reinforcing rubber was confirmed visually to assess the durability of the reinforcing rubber in the run-flat tire. Table 1 shows a result of the assessment.

(A3) Assessment of Cavity Resonance Sound

The above run-flat tire mounted to the rim was driven (non-run-flat running) on a drum test machine under the conditions of an internal pressure of 220 kPa, a load of 4.4 kN, and a rate of 60 km/h. At this time, the vertical tire axial force of the run-flat tire was measured by using a wheel force sensor attached to a tire shaft. Increase and decrease in sound pressure level at a peak found around 225 Hz and 240 Hz, i.e., frequencies attributed to a cavity resonance phenomenon of the tire, were assessed. Table 1 shows a result of the assessment.

(B) Study on Value of A×N

Changes in the sound absorption effect in response to varying values of A×N described above were studied by simulation.

The conditions of simulation were as follows. As the short fibers, those each having a cylindrical shape with a constant section and extending perpendicularly with respect to the bonded surface were used. As the frequency of vehicle noise attributed to the cavity resonance phenomenon of the tire, 225 Hz was employed. The length of each short fiber was 4 mm. For cases where the average diameter D of the short fibers was varied from 35 μm (10 denier) to 50 μm (20 denier) and to 60 μm (30 denier), simulations were conducted by changing the product (A×N) of the average sectional area A (mm$^2$/each fiber) of each short fiber and the number N (fibers/mm$^2$) of the short fibers bonded per 1 mm$^2$ area in the regions where the short fibers were bonded, and thus, sound absorption rates were obtained. A sound absorption rate refers to a ratio of the energy of sound not reflected from a bonded surface to which the short fibers are bonded, to the energy of sound incident on the bonded surface. The sound absorption rate is found not to be affected substantially by the aforementioned materials of the short fibers.

Figure 3:
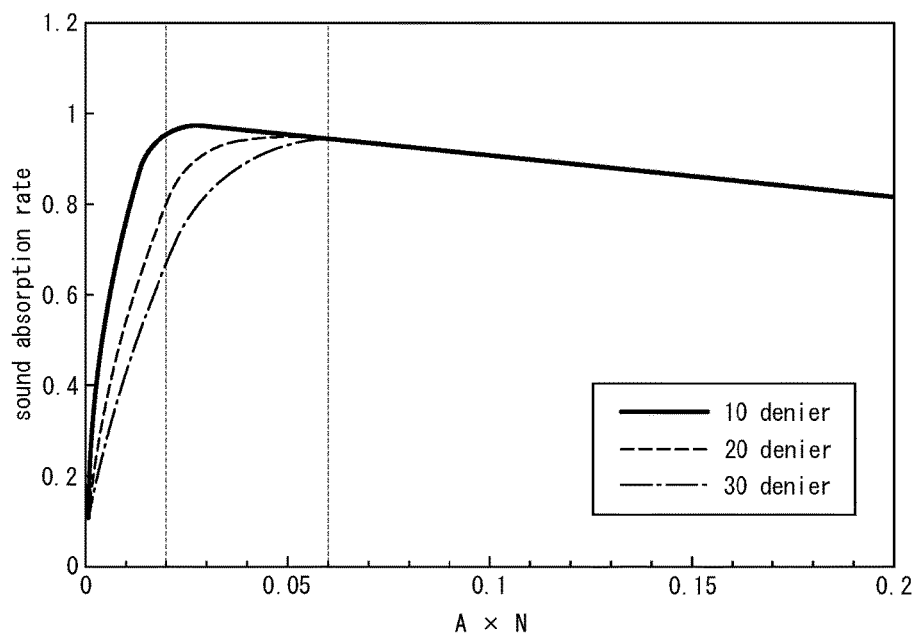
FIG. 3 is a graph illustrating a relation between the value of (an average sectional area A of the section of each of the short fibers that is not in contact with the tire inner surface)× (the number N of the short fibers bonded per 1 mm² area in a region of the tire inner surface where the short fibers are bonded) and sound absorption rate.

Results are shown in Table 3. The results of simulations shown in FIG. 3 indicate that an enhanced sound absorption effect may be obtained when A×N is 0.02 or more. On the other hand, as can be seen, the sound absorption effect sharply decreases when A×N is less than 0.02. Furthermore, as can be seen, the sound absorption effect gradually decreases when A×N is greater than 0.06.

TABLE 1

| | | Conventional Example 1 | Comparative Example 1 | Comparative Example 2 | Example 1 |
|---|---|---|---|---|---|
| Type of tire | | Run-flat tire | Run-flat tire | Run-flat tire | Run-flat tire |
| Presence of short fibers | | Absent | Present | Present | Present |
| Type of adhesive layer | | — | Adhesive agent | Adhesive agent | Adhesive agent |
| Heatproof temperature of adhesive layer (° C.) | | — | 120 | 40 | 70 |
| Portions of tire inner surface to which short fibers are bonded | Tire inner surface region corresponding to tread portion | — | Yes | Yes | Yes |
| | Tire inner surface regions corresponding to side portions (except for reinforcing rubber) | — | Yes | Yes | Yes |
| | Tire inner surface regions corresponding to reinforcing rubber | — | Yes | Yes | Yes |
| A × N (refer to FIG. 3) | | — | 0.04 | 0.04 | 0.04 |
| Number N (fibers/cm$^2$) of the short fibers bonded per unit area in regions where short fibers are bonded | | — | 2000 | 2000 | 2000 |
| Average length L (mm) of short fibers | | — | 4 | 4 | 4 |
| Average diameter D (μm) of short fibers | | — | 50 | 50 | 50 |
| L/D | | — | 80 | 80 | 80 |
| Portion(s) of tire inner surface from which short fibers are detached | 10-minute run-flat running | — | No detached portion | Tire inner surface regions corresponding to reinforcing rubber and other regions | Tire inner surface regions corresponding to reinforcing rubber |
| | 1-minute run-flat running | — | No detached portion | Tire inner surface regions corresponding to reinforcing rubber | Tire inner surface regions corresponding to reinforcing rubber |
| | Non-run-flat running | — | No detached portion | Tire inner surface regions corresponding to reinforcing rubber | No detached portion |
| Increase and decrease in sound pressure level at 225 Hz and 240 Hz | | — (Reference) | 5.6 dB, 6.9 dB | 5.6 dB, 6.9 dB | 5.6 dB, 6.9 dB |

Conventional Example 1

A run-flat tire was prepared in the same way as Example 1, except for that the short fibers were not bonded to the tire inner surface, and assessments (A1) to (A3) were conducted in a similar manner to Example 1. Table 1 shows results of the assessments.

Comparative Examples 1 and 2

Run-flat tires were prepared in the same way as Example 1, except for that the heatproof temperatures of the adhesive layers were set to the values shown in Table 1, and assessments (A1) to (A3) and (B) were conducted in a similar manner to Example 1. Table 1 shows results of the assessments.

INDUSTRIAL APPLICABILITY

According to the side-reinforced run-flat tire of the present disclosure, the short fibers bonded, via the adhesive layer, to the tire inner surface regions corresponding to the reinforcing rubber are detached during run-flat running, thereby making it easy to confirm the history of run-flat running.

Furthermore, the side-reinforced run-flat tire according to the present disclosure provides the effects of preventing, during run-flat running, deterioration in the reinforcing rubber caused by heat and reducing, during normal running, cavity resonance sound by the short fibers.

REFERENCE SIGNS LIST

1: Side-reinforced run-flat tire according to example of present disclosure
  2: Tread portion
  3: Sidewall portion
  4: Bead portion
  5: Reinforcing rubber
  6: Tire inner surface
  9: Adhesive layer
  9a: Adhesive agent
  10: Short fiber
  11: Bead toe
  12: Bead filler
  13: Carcass
  14: Belt
R2: Tire inner surface region corresponding to tread portion
R5: Tire inner surface region corresponding to reinforcing rubber
  Rs: Tire inner surface region located in side portion
  Tw1: Tread ground-contact end
  Tw1': Intersection
Xo: Outermost end of reinforcing rubber in tire radial direction
  Xo': Intersection
Xi: Innermost end of reinforcing rubber in tire radial direction
  Xi': Intersection

The invention claimed is:

1. A side-reinforced run-flat tire comprising a tread portion, a pair of sidewall portions extending on both sides of the tread portion, and reinforcing rubber provided in the sidewall portions, the side-reinforced run-flat tire further comprising:
short fibers bonded, via an adhesive agent, to at least a portion of a region of a tire inner surface that is located in each of the sidewall portions, wherein
the adhesive agent has a softening temperature measured in accordance with JIS K6833 of from 50 to 100° C.

2. The side-reinforced run-flat tire according to claim 1, further comprising:
short fibers bonded to at least a portion of a region of the tire inner surface that corresponds to the tread portion.

3. The side-reinforced run-flat tire according to claim 1, wherein,
when an average sectional area of a section of each of the short fibers that is not in contact with the tire inner surface is defined as A (mm$^2$/each fiber), and a number of the short fibers bonded per 1 mm$^2$ area in the region of the tire inner surface where the short fibers are bonded is defined as N (fibers/mm$^2$), the relation $0.02 \leq A \times N \leq 0.06$ is satisfied.

4. The side-reinforced run-flat tire according to claim 2, wherein,
when an average sectional area of a section of each of the short fibers that is not in contact with the tire inner surface is defined as A (mm$^2$/each fiber), and a number of the short fibers bonded per 1 mm$^2$ area in the region of the tire inner surface where the short fibers are bonded is defined as N (fibers/mm$^2$), the relation $0.02 \leq A \times N \leq 0.06$ is satisfied.

5. The side-reinforced run-flat tire according to claim 1, wherein,
the adhesive agent has a softening temperature measured in accordance with JIS K6833 of from 60 to 70° C.

6. The side-reinforced run-flat tire according to claim 3, wherein,
the relation $0.03 \leq A \times N \leq 0.05$ is satisfied.

7. The side-reinforced run-flat tire according to claim 4, wherein,
the relation $0.03 \leq A \times N \leq 0.05$ is satisfied.

8. The side-reinforced run-flat tire according to claim 1, wherein,
the ratio L/D of an average length L of the short fibers to an average diameter D of the short fibers is from 5 to 2000.

9. The side-reinforced run-flat tire according to claim 1, wherein
the short fibers are detached when a temperature of the reinforcing rubber exceeds the softening temperature of the adhesive agent.

10. The side-reinforced run-flat tire according to claim 9, wherein,
when an average sectional area of a section of each of the short fibers that is not in contact with the tire inner surface is defined as A (mm$^2$/each fiber), and a number of the short fibers bonded per 1 mm$^2$ area in the region of the tire inner surface where the short fibers are bonded is defined as N (fibers/mm$^2$), the relation $0.02 \leq A \times N \leq 0.06$ is satisfied.

11. The side-reinforced run-flat tire according to claim 10, wherein,
the relation $0.03 \leq A \times N \leq 0.05$ is satisfied.

* * * * *